United States Patent
Han et al.

(10) Patent No.: US 11,131,916 B2
(45) Date of Patent: Sep. 28, 2021

(54) LIGHT SOURCE MOVABLE PROJECTOR

(71) Applicant: LG ELECTRONICS INC., Seoul (KR)

(72) Inventors: Jongbeom Han, Seoul (KR); Sanghyuk Im, Seoul (KR); Haklim Lee, Seoul (KR); Sangyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/751,531

(22) Filed: Jan. 24, 2020

(65) Prior Publication Data

US 2021/0191244 A1 Jun. 24, 2021

(30) Foreign Application Priority Data

Dec. 20, 2019 (KR) .......................... 10-2019-0171932

(51) Int. Cl.
*G03B 21/20* (2006.01)

(52) U.S. Cl.
CPC ................................ *G03B 21/2046* (2013.01)

(58) Field of Classification Search
CPC ........ G03B 21/10; G03B 21/58; G03B 21/145; G03B 21/2013; G03B 21/2053; G03B 21/2046; H04N 9/3141; H04N 9/3155; H04N 9/3164
See application file for complete search history.

(56) References Cited

U.S. PATENT DOCUMENTS

| | | | |
|---|---|---|---|
| 10,302,413 B2 | 5/2019 | Bridges | |
| 2019/0238830 A1* | 8/2019 | Price | H04N 17/002 |
| 2019/0353991 A1* | 11/2019 | Shimamura | G03B 21/142 |

* cited by examiner

*Primary Examiner* — Sultan Chowdhury
(74) *Attorney, Agent, or Firm* — Birch, Stewart, Kolasch & Birch, LLP

(57) ABSTRACT

The present disclosure provides a projector including a first and a second guide members having a shape of a portion of an annular ring and comprising a first and as second slots formed along a ring line, respectively, the second slot overlapping the first slot at one point, a first and a second driving parts configured to rotate the first guide member, and a light source part having a vertical axis tilted in a state in which the light source part is constrained to the first slot and the second slot including a first and a second movable members configured to move in a longitudinal direction of the first and second slots, respectively, and a light source formed in an outer end portion of the light source part and fixed to one of the first movable member and the second movable member to move.

15 Claims, 11 Drawing Sheets

-Related Art-

-Related Art-

-Related Art-

LIGHT SOURCE MOVABLE PROJECTOR

CROSS-REFERENCE TO RELATED APPLICATION

This application claims the benefit of Korean Patent Application No. 10-2019-0171932, filed on Dec. 20, 2019, in the Korean Intellectual Property Office, the disclosure of which is incorporated herein in its entirety by reference.

BACKGROUND

1. Field

This disclosure relates to a projector that outputs an image light onto a screen and moves a position of an image output by a light source on the screen.

2. Description of the Related Art

A projector refers to a device that outputs an image on a screen by emitting a light source. A light source emitting direction of the projector may determine a position of the image on the screen. In some cases, the image may be required to be relocated on the screen, which may be solved by adjusting the light source emitting direction on the projector.

A conventional mechanism for adjusting a light source emitting direction is a turret-type projector that tilts and rotates a light source or the projector as illustrated in FIG. 1. However, when the turret-type projector is applied to a screen of a two-axis plane coordinate system, rotation is performed along with parallel movement so that an output direction is not maintained. This can be solved by applying a method of correcting a rotated image through software as illustrated in FIG. 2, which, however, may lead to a size reduction of the output image.

In addition, as illustrated in FIG. 3, the turret-type projector is not intuitive and requires a relatively large amount of time for movement because an image cannot move from one position to another position in a straight distance based on a tilting and rotating driving principle.

SUMMARY

An aspect is to solve an issue of image rotation occurring when an image is relocated on a screen by adjusting a projector.

Another aspect is to solve an issue that an image is not moved through a shortest path when the image is relocated on a screen by adjusting a projector.

According to an aspect, there is provided a projector including a first guide member having a shape of a portion of an annular ring and including a first slot formed along a ring line, a second guide member having a shape of a portion of an annular ring and including a second slot formed along a ring line, the second slot overlapping the first slot at one point, a first driving part configured to rotate the first guide member, a second driving part configured to rotate the second guide member, and a light source part having a vertical axis tilted in a state in which the light source part is constrained to the first slot and the second slot in response to driving of the first driving part or the second driving part, wherein the light source part includes a first movable member configured to move in a longitudinal direction of the first slot, a second movable member configured to move in a longitudinal direction of the second slot, and a light source formed in an outer end portion of the light source part and fixed to one of the first movable member and the second movable member to move.

The first movable member may not be relatively rotated with respect to the first slot based on the vertical axis as a rotation axis. The second movable member may not be relatively rotated with respect to the second slot based on the vertical axis as a rotation axis.

The first movable member and the second movable member may be mutually rotatable based on the vertical axis as a rotation axis.

Each of the first slot and the second slot may have a constant curvature radius.

A curvature center of the first slot may be provided on a rotation axis of the second guide member. A curvature center of the second slot may be provided on a rotation axis of the first guide member.

A curvature center of the first slot may be coincident with a curvature center of the second slot.

The rotation axis of the first guide member and the rotation axis of the second guide member may be vertical to each other.

The projector may further include a variable structure configured to vary the first movable member and the second movable member to be apart from or close to each other with respect to a direction of the vertical axis.

The projector may further include a first bearing structure disposed between the first movable member, and the first slot and a second bearing structure disposed between the second movable member and the second slot.

The first bearing structure and the second bearing structure may each include a bearing ball, and a ball seating space formed longitudinally in the corresponding slot such that the bearing ball is sit therein.

The projector may further include a first support rib that protrudes from the first movable member vertically to the vertical axis to cover a top surface of the first slot, and a second support rib that protrudes from the second movable member vertically to the vertical axis to cover a bottom surface of the second slot.

An inner end portion of the light source part may have a curved surface having a constant curvature radius.

A curvature center of the inner end portion of the light source part may be coincident with curvature centers of the first slot and the second slot.

The projector may further include a protruding surface for supporting the inner end portion of the light source part.

The first driving part may include a first motor and a first connection member configured to connect the first guide member and the first motor. The second driving part may include a second motor and a second connection member configured to connect the second guide member and the second motor. Each of the first connection member and the second connection member may be provided to be shifted to a ground from each rotation axis of the first guide member and the second guide member.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
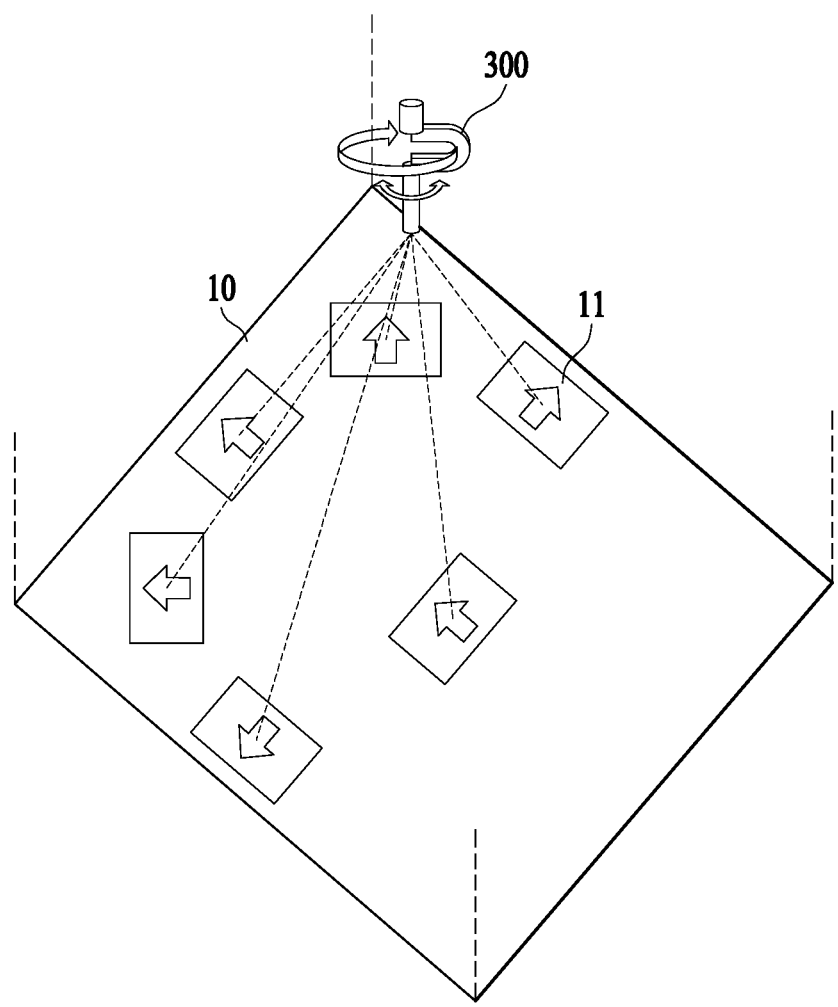
FIGS. 1 through 3 schematic views illustrating a conventional projector and a screen image obtained by the projector.
Figure 2:
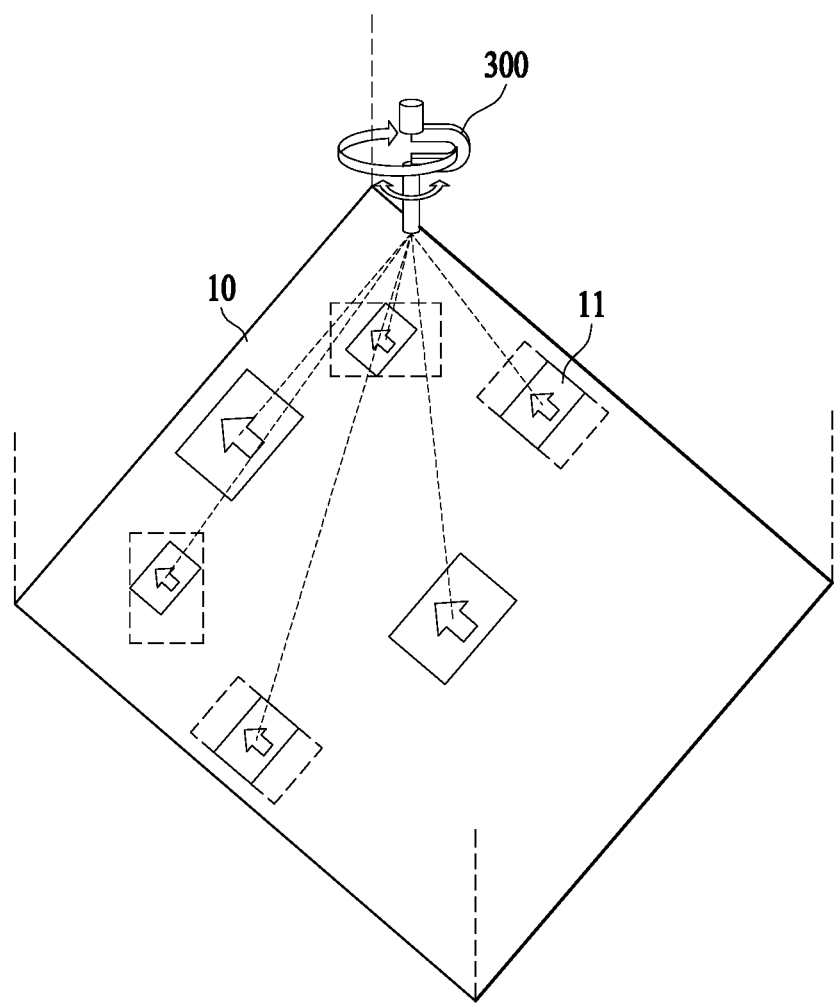
Figure 3:
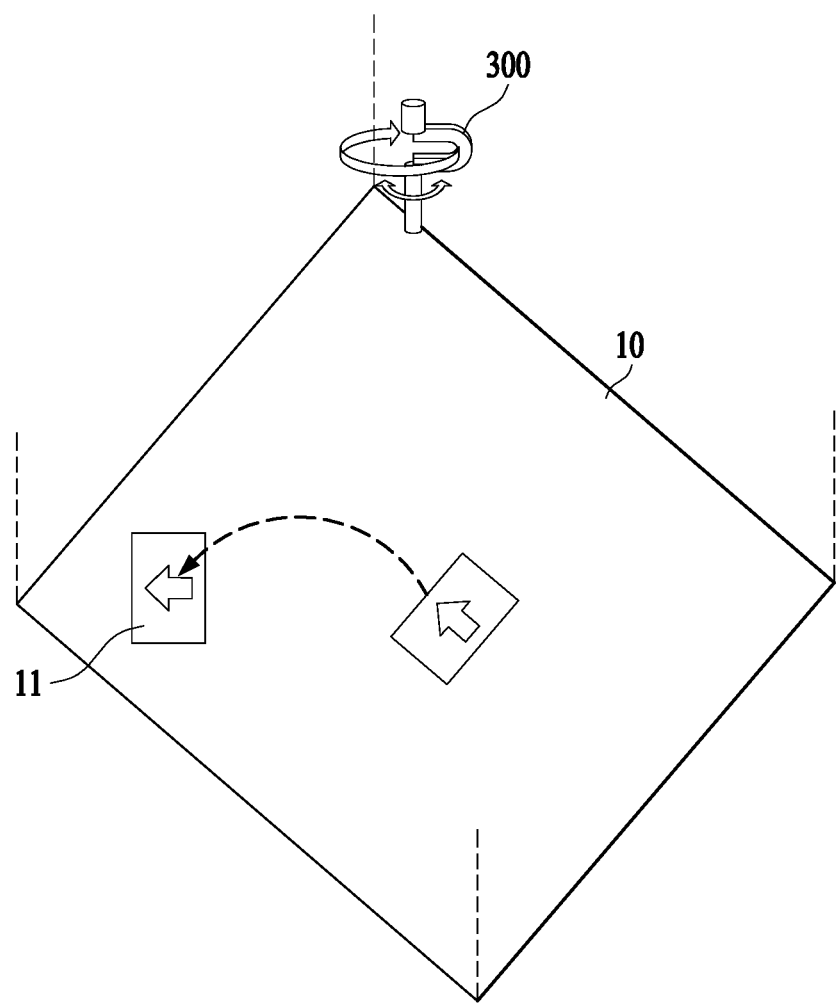

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Also, in the description of embodiments, detailed description of well-known related structures or functions will be omitted when it is deemed that such description will cause ambiguous interpretation of the present disclosure. It should be understood, however, that there is no intent to limit this disclosure to the particular example embodiments disclosed. On the contrary, example embodiments are to cover all modifications, equivalents, and alternatives falling within the scope of the example embodiments.

Terms such as first, second, A, B and the like may be used merely to distinguish the component from other component(s) when the component corresponding to the reference numeral is provided in plural. For example, unless otherwise limited and described, reference numerals 1000A and 1000B correspond to the same components of 1000 but separate from one another.

Figure 4:
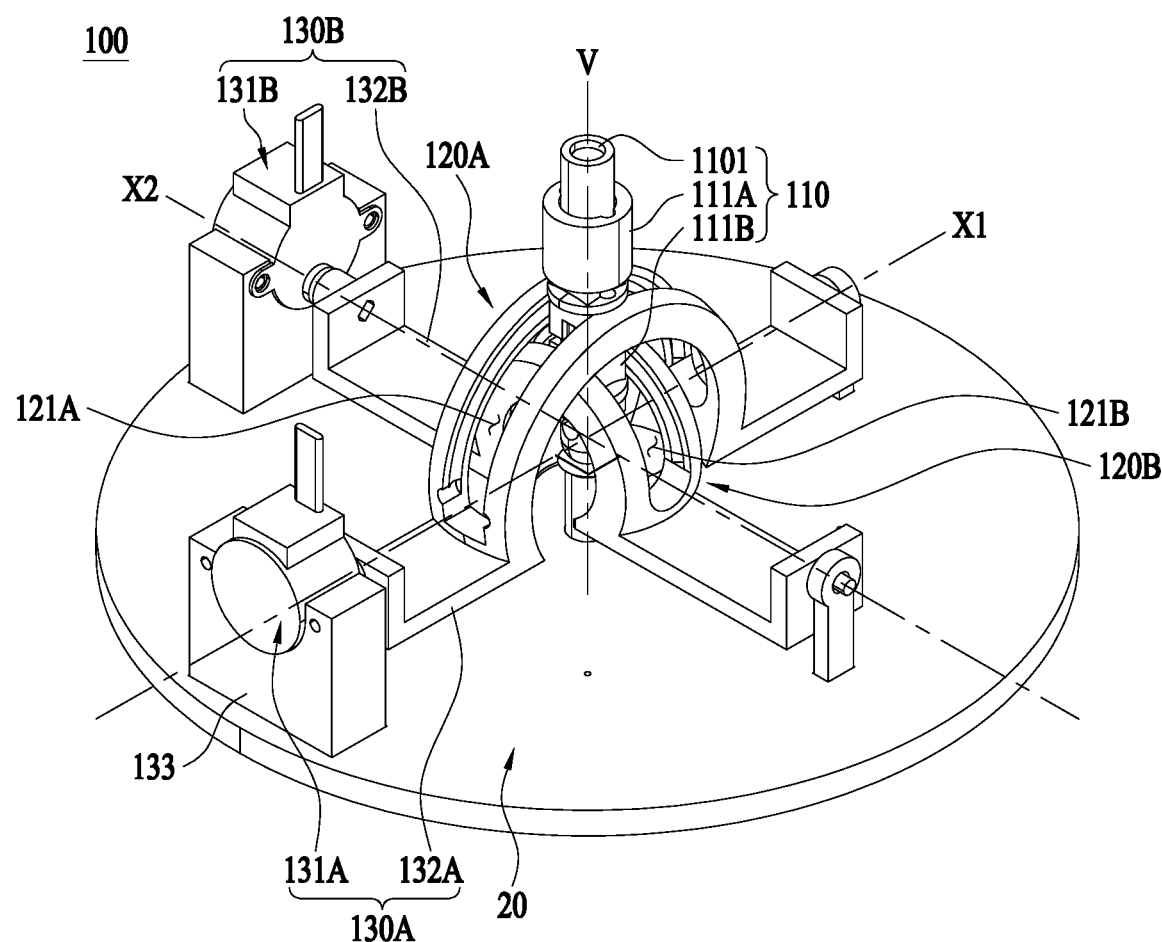
FIG. 4 is a front perspective view illustrating a projector according to an example embodiment of the present disclosure.
Figure 5A:
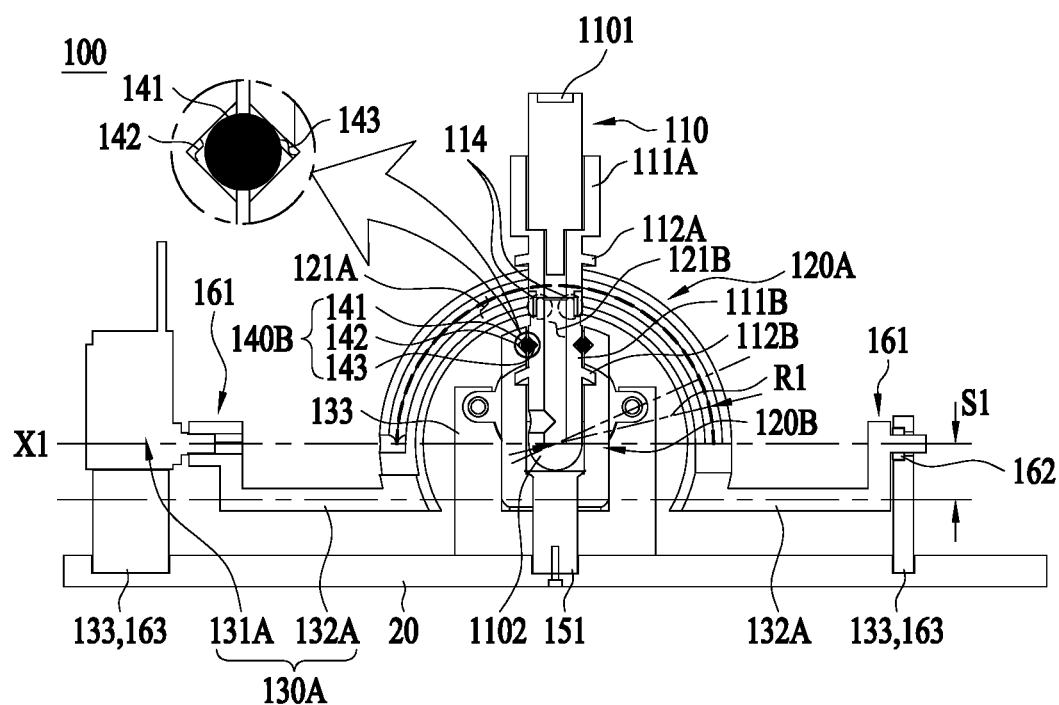
FIG. 5A illustrates a vertical cross-sectional view including an axis X1 of FIG. 4
Figure 5B:
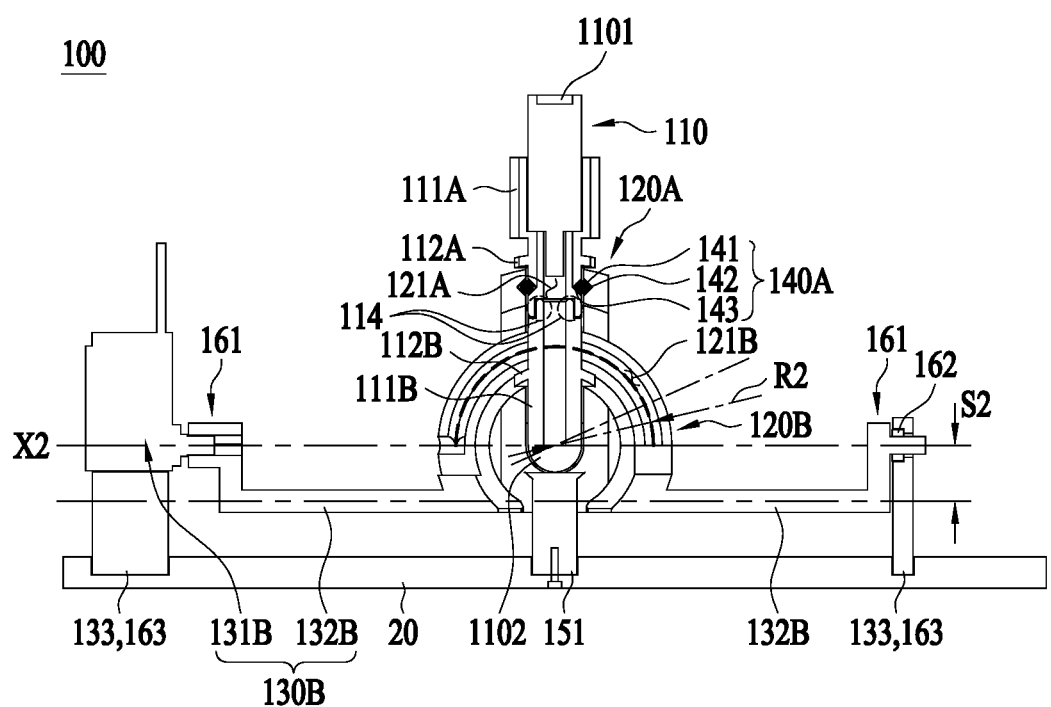
FIG. 5B illustrates a vertical cross-sectional view including an axis X2 of FIG. 4.
Figure 6:
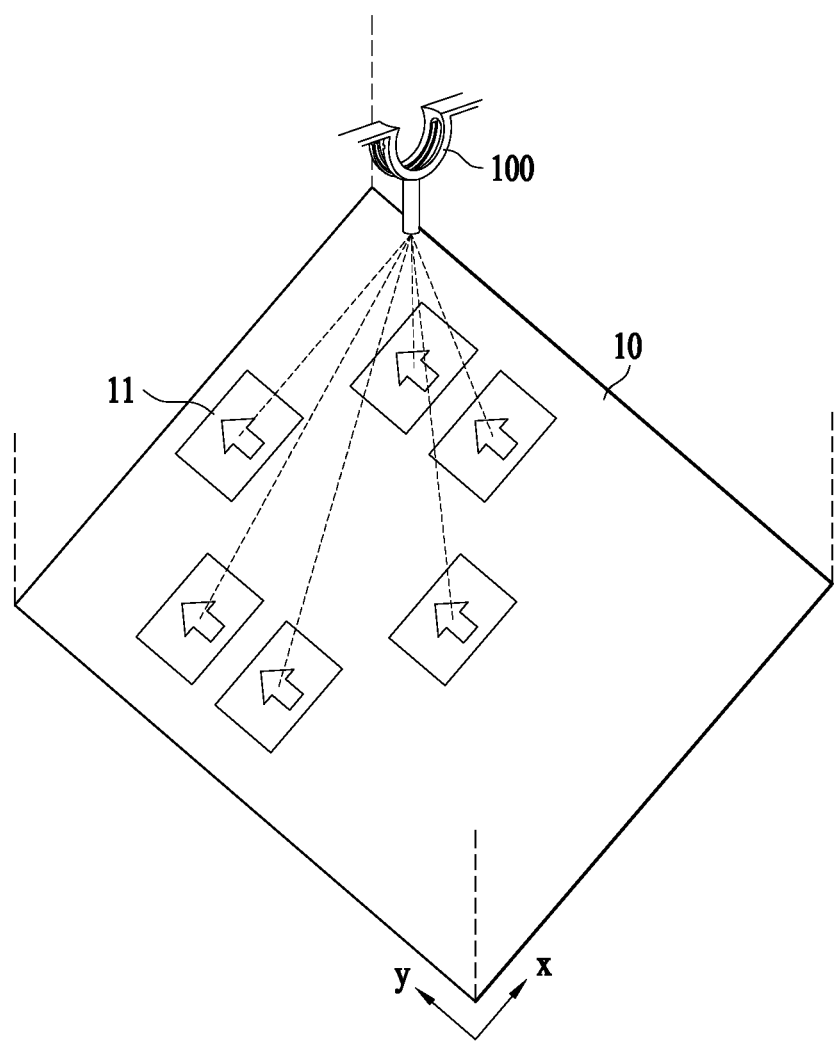
FIG. 6 illustrates a screen image moved by a projector according to the present disclosure.
Figure 7A:
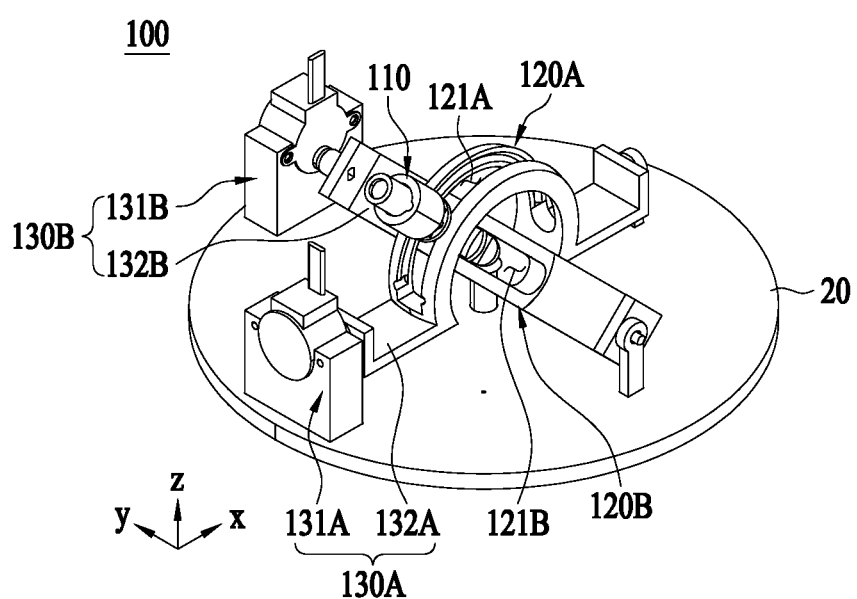
FIG. 7A illustrates a state in which the light source part is moved along the first slot.
Figure 7B:
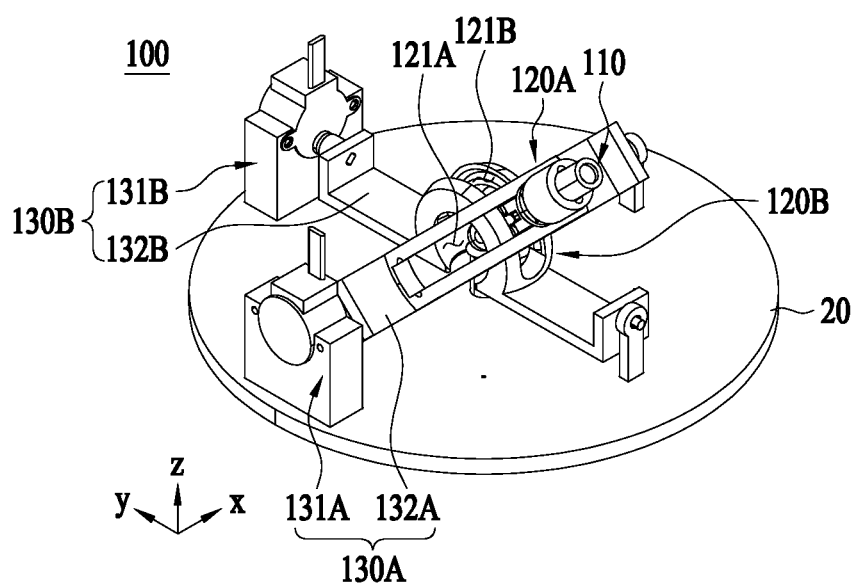
FIG. 7B illustrates a state in which the light source part is moved along the second slot.
Figure 7C:
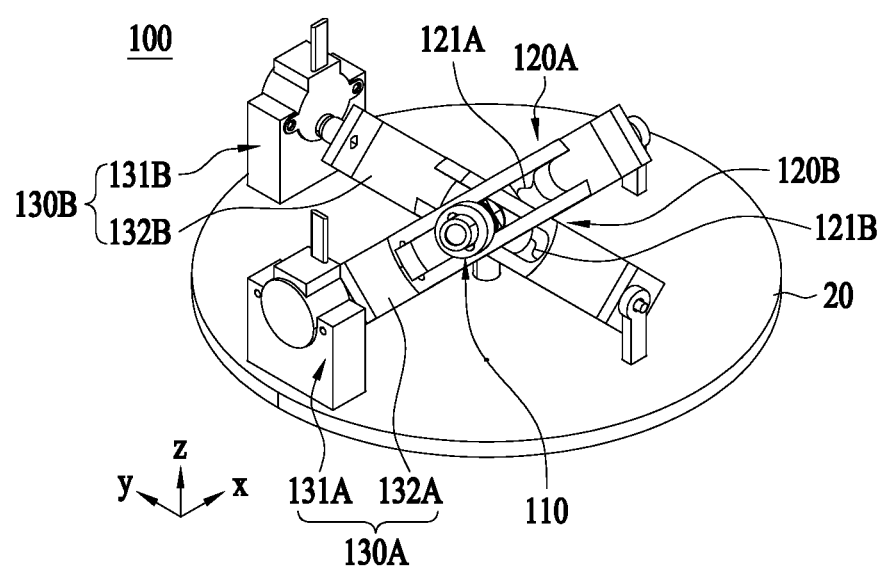
FIG. 7C illustrates a state in which the light source part is moved along the first slot and the second slot.

FIG. 4 is a front perspective view illustrating a projector 100 according to an example embodiment of the present disclosure, FIG. 5A illustrates a vertical cross-sectional view including an axis X1 of FIG. 4 and FIG. 5B illustrates a vertical cross-sectional view including an axis X2 of FIG. 4, FIG. 6 illustrates an image 11 moved on a screen 10 by the projector 100 related to the present disclosure, and FIG. 7A through 7C illustrate states in which a light source part 110 moves on a first slot 121A or a second slot 121B of the projector 100 related to the present disclosure. Based on the light source part 110 vertical to an installation surface 20, FIG, 7A illustrates a state in which the light source part 110 is moved along the first slot 121A, FIG. 7B illustrates a state in which the light source part 110 is moved along the second slot 121B, and FIG. 7C illustrates a state in which the light source part 110 is moved along the first slot 121A and the second slot 121B.

To solve the above-described issues of a turret-type projector 300, the present disclosure proposes a slot structure that maintains an angle of the light source part 110 to prevent the image 11 by a light source 1101 of the light source part 110 from rotating on the screen 10 while allowing the image 11 to move only when a vertical axis V of the light source part 110 is tilted.

The light source part 110 may move along a slot 121 formed in a guide member 120. The guide member 120 may be at least two guide members.

Specifically, the guide member 120 may have a shape of a portion of an annular ring. The slot 121 may be formed along a ring line. The annular ring may refer to a form in which a curvature radius is constant. Thus, the slot 121 formed along the ring line may have a constant curvature radius.

The guide member 120 is not necessarily provided in a ring shape for the formation of the slot 121. However, it is desirable for the guide member 120 to have the ring shape in order to minimize interference with another member (for example, a housing 133) or the projector installation surface 20 during rotation and secure at least an area for the slot 121.

One of the two guide members 120 may also be referred to as a first guide member 120A and a remaining one may also be referred to as a second guide member 120B. The slot 121 formed in the first guide member 120A may also be referred to as the first slot 121A, and the slot 121 formed in the second guide member 120B may also be referred to as the second slot 121B.

The first guide member 120A and the second guide member 120B may be provided to overlap each other. Likewise, the first slot 121A and the second slot 121B may overlap each other. One of the two guide members 120A and 120B may be greater in size than the other one so that the first guide member 120A and the second guide member 120B overlap each other. Likewise, one of the slots 121A and 121B of the two guide members 120A and 120B may be less in size than the other one. The following description will be made based on a curvature radius R1 of the first guide member 120A greater than a curvature radius R2 of the second guide member 120B as an example. That is, the curvature radius R1 of the first slot 121A is greater than the curvature radius R2 of the second slot 121B.

Particularly, the first slot 121A and the second slot 121B may meet at one point to be vertical to each other. More specifically, at the one point, a tangent line of the first slot 121A and a tangent line of the second slot 121B may be vertical to each other. The one point may be a highest point from the projector installation surface 20 of the first slot 121A or a highest point from the projector installation surface 20 of the second slot 121B. Since the first slot 121A and the second slot 121B meet to be vertical to each other, a force applied from another guide member to move the light source part 110 on the slot 121 may act maximally. For example, when the two slots 121A and 121B are vertical to each other, the second guide member 120B may push the light source part 110 in a longitudinal direction of the first slot 121A, so that the light source part 110 moves with less force on the first slot 121A. In the opposite case, the same principle may be applied.

For example, as illustrated in FIGS. 6 through 7C, on the screen 10 forming a coordinate system including an x axis and a y axis orthogonal to each other, the longitudinal direction of the first slot 121A may be an x-axial direction and the longitudinal direction of the second slot 121B may be a y-axial direction. In this example, a movement of the light source part 110 in the first slot 121A may correspond to a horizontal movement of the image 11 on the screen 10, and a movement of the light source part 110 in the second slot 121B may correspond to a vertical movement of the image 11 on the screen 10.

The guide member 120A, 120B may include driving parts that rotate about a straight line passing two points as a rotation axis at both longitudinal sides of the slot 121A, 121B. A driving part provided in the first guide member 120A to rotate the first guide member 120A may also be referred to as a first driving part 130A. A driving part provided in the second guide member 120B to rotate the second guide member 120B may also be referred to as a second driving part 130B.

A tilting degree of the vertical axis V of the light source part 110, that is, a position of the light source part 110 on the slot 121 may be complexly determined based on states of the first guide member 120A and the second guide member 120B. In other words, the movement of the light source part 110 on the first slot 121A or the movement of the light source part 110 on the second slot 121B may be complexly implemented by the first driving part 130A and the second driving part 130B.

The rotation axis X1 of the first driving part 130A and the rotation axis X2 of the second driving part 130B may be vertical to each other, which may be based on the same reason that the first slot 121A and the second slot 121B are mutually vertical at one point.

A curvature center of the first slot 121A and a curvature center of the second slot 121B may meet at the same position. The first driving part 130A may be disposed such that the curvature center of the first slot 121A is located on the rotation axis of the first driving part 130A. Also, the second driving part 130B may be disposed such that the curvature center of the second slot 121B is located on the rotation axis of the second driving part 130B. In this case, the light source part 110 may perform an ideal movement to move on a hemispherical surface overall.

Figure 8:
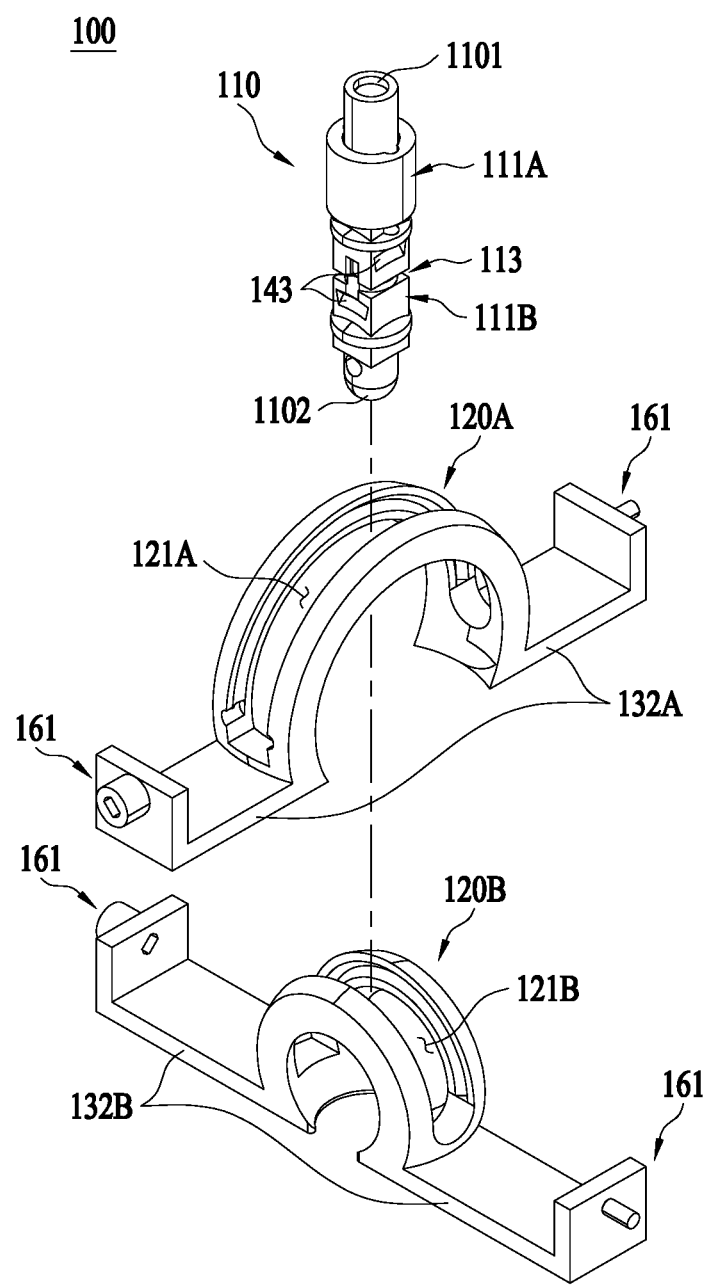
FIG. 8 is a partial exploded view illustrating a light source part according to the present disclosure.

FIG. 8 is a partial exploded view illustrating the projector 100 including the light source part 110 according to the present disclosure. Reference will be made along with FIGS. 5A and 5B.

The light source part 110 includes a first movable member 111A that moves while being constrained to the first slot 121A and a second movable member 111B that moves while being constrained to the second slot 121B. The first movable member 111A may be guided to move along the first slot 121A, and the second movable member 111B may be guided to move along the second slot 121B. Thus, a movement trajectory of the light source part 110 may correspond to a shape or trajectory of the first slot 121A, and a shape or trajectory of the second slot 121B.

When moving along the first slot 121A, the first movable member 111A may move in the longitudinal direction of the first slot 121A and may not rotate about the vertical axis V as a rotation axis with respect to the longitudinal direction of the first slot 121A. When moving along the second slot 121B, the second movable member 111B may move in the longitudinal direction of the second slot 121B and may not rotate about the vertical axis V as a rotation axis with respect to the longitudinal direction of the second slot 121B.

Meanwhile, the first movable member 111A and the second movable member 111B may relatively rotate. Thus, the light source part 110 may have a structure 113 in which the first movable member 111A and the second movable member 111B relatively rotate.

The light source 1101 that outputs an image light may be fixed to either the first movable member 111A or the second movable member 111B. The light source 1101 may be tilted along with a movable member to which the light source 1101 is fixed, and may not rotate about the vertical axis V as a rotation axis. Through this, the light source 1101 may output the image 11 to the screen 10 in a constant direction without need to expand a deactivated area to correct an image in the constant direction like the turret-type projector. When an output direction of the light source 1101 is not vertical to the screen 10, an output size of the image 11 may vary for each area based on a distance, which may require a correction through software.

To implement a non-rotating structure on each slot 121, the first movable member 111A may have a shape corresponding to only the longitudinal direction of the first slot 121A, and the second movable member 111B may have a shape corresponding to only the longitudinal direction of the second slot 121B. For example, when the slots 121A and 121B have parallel steps facing each other, the movable members 111A and 111B may correspondingly have guiders (not shown) to move on the parallel steps. Here, the parallel steps may indicate that tangent lines of the steps are parallel, and the steps and the guiders may have constant curvature radiuses overall.

A bearing structure 140 may be disposed between each slot 121A, 121B and the corresponding movable member 111A, 111B to minimize friction when the movable member 111A, 111B moves in the slot 121A, 121B. The bearing structure 140 disposed between the first movable member 111A and the first slot 121A may also be referred to as a first bearing structure 140A. Also, the bearing structure 140 disposed between the second movable member 111B and the second slot 121B may also be referred to as a second bearing structure 140B. The bearing structure 140 may include a bearing ball 141 and a ball seating space 142, 143 in which the bearing ball is mounted. The ball seating space 142, 143 may be formed in an area in which the slot 121 and the movable member 111A, 111B faces. A cross section of the ball seating space 142, 143 may include a polygonal shape for seating the bearing ball 141. For example, the cross section may provide a square space.

When the ball seating spaces 142 and 143 are formed in the slot 121 and the movable member 111, the bearing ball 141 may function to fix the slot 121 and the movable member 111. When the bearing ball 141 functions to fix the slot 121 and the movable member 111, a structure of the step and the guider provided between the slot 121 and the movable member 111 may be replaced by the bearing ball 141 and the ball seating space 142, 143. For example, the bearing ball 141 may function as the step and the ball seating space 142, 143 may function as the guider.

When the first slot 121A is coincident with the curvature center of the second slot 121B, the first movable member 111A and the second movable member 111B may not move vertically.

Conversely, when the first slot 121A is different from the curvature center of the second slot 121B, the first movable member 111A and the second movable member 111B may have a variable structure 114 that varies the first movable member 111A and the second movable member 111B to be apart from or close to each other in a direction of the vertical axis V of the light source part 110.

The first movable member 111A and the second movable member 111B may respectively include support ribs 112A and 112B so as not to be deviated from the guide members. The support rib of the first movable member 111A may also be referred to as a first support rib 112A, and the support rib of the second movable member 111B may also be referred to as a second support rib 112B. The first support rib 112A may laterally protrude from the first movable member 111A and sit on a top surface of the first slot 121A. For example, when the first guide member 120A has a step to correspond to a width of the first support rib 112A, the light source part 110 may move stably in the first slot 121A. In this case, the first support rib 112A may be the guider described above.

The second support rib 112B may laterally protrude from the second movable member 111B and support a bottom surface of the second slot 121B. The second support rib 112B may assist a movement of the light source part 110 by supporting the bottom surface of the second slot 121B, so that the light source part 110 is prevented from upwardly deviating from the first guide member 120A or the second guide member 120B.

Referring to FIGS. 5A and 5B together, the first driving part 130A and the second driving part 130B may respectively include a first motor 131A and a second motor 131B to generate a rotational force, and respectively include connection members 132A and 13213 connected to the first motor 131A and the second motor 131B to transfer the rotational force to the corresponding guide members. The connection member connected to the first motor 131A may also be referred to as a first connection member 132A, and the connection member connected to the second motor 132B may also be referred to as a second connection member 132B. The first connection member 132A and the second connection member 132B may be shifted by S1 and S2 based on the corresponding rotation axes to secure areas for the slots 121A and 121B of the guide members 120A and 12013, so as to be connected to the guide members 120A and 120B.

When the areas for the slots 121A and 121B are secured, a tilting angle range of the light source part 110 may increase. In the example embodiment, the light source part 110 may move within a range close to a hemisphere. Also, when the projector 100 is installed on an indoor ceiling, projection onto a floor surface and side surfaces may be possible.

For example, the first connection member 132A and the second connection member 132B may be formed to be biased toward the projector installation surface 20 from the corresponding rotation axes. In this example, it is desirable not to set shifting displacements S1 and S2 excessively because a space occupied by the connection members 132A and 132B due to the rotation increases as a degree of shifting from the rotation axis increases.

The connection member 132A, 132B may be connected at both sides of the guide member 120A, 120B. The driving part 130A, 130B may include rotary structures 161 forming a rotation axis at both sides of the connection member 132A, 132B to stably rotate the guide member 120A, 120B. The connection member 132A, 132B may be integrally formed with the guide member 120A, 120B.

The rotary structure 161 may rotatably connect the motor 131A, 131B and the connection member 132A, 132B such that the connection member 132A, 132B is rotatable. The rotary structure 161 may include a bearing structure 162 to minimize a frictional force. Each of the rotary structures 161 may be fixed to the projector installation surface 20 or a structure 163 that secures a predetermined distance from the projector installation surface 20. The structure 163 may be a separate member and also be a portion of the housing 133 of the projector 100.

A side of the projector installation surface 20 of the light source part 110, that is, an inner end portion 1102 may form a curved surface. The curved surface may support the projector installation surface 20 or a protruding surface 151 protruding from the projector installation surface 20, stably even when the light source part 110 is moving. Particularly, the curved surface may be a portion of a sphere with a constant curvature center. For example, the inner end portion 1102 of the light source part 110 may include a hemisphere shape. A center of the hemisphere may be coincident with the curvature center of the first slot 121A or the second slot 121B. The inner end portion 1102 of the light source part 110 may be coupled with the second movable member 111B as a separate member, and also be integrally formed with the second movable member 111B.

The following are effects of a projector according to the present disclosure.

According to at least one embodiment of the present disclosure, it is possible to move an image on a screen while preventing the image from rotating.

Further, according to at least one embodiment of the present disclosure, it is possible to minimize interference between two guide members that guide a light source to move an image.

Additional ranges of possibilities will become apparent from the following detailed description. It should be understood, however, that the detailed description and specific examples, such as the preferred embodiments of the disclosure, are given by way of illustration only, since various changes and modifications within the spirit and scope of the disclosure will be apparent to those skilled in the art.

The above detailed description should not be construed as limiting in all respects but should be considered as illustrative. The scope of the disclosure should be determined by reasonable interpretation of the appended claims, and all changes within the equivalent scope of the disclosure are included in the scope of the disclosure.

What is claimed is:

1. A projector comprising:
   a first guide member having a shape of a portion of an annular ring and comprising a first slot formed along a ring line;
   a second guide member having a shape of a portion of an annular ring and comprising a second slot formed along a ring line, the second slot overlapping the first slot at one point;
   a first driving part configured to rotate the first guide member with a straight line passing both sides of the first slot as a rotation axis of the first driving part;
   a second driving part configured to rotate the second guide member with a straight line passing both sides of the second slot as a rotation axis of the second driving part; and
   a light source part having a vertical axis tilted in a state in which the light source part is constrained to the first slot and the second slot in response to driving of the first driving part or the second driving part,
   wherein the light source part comprises:
      a first movable member configured to move in a longitudinal direction of the first slot;
      a second movable member configured to move in a longitudinal direction of the second slot; and
      a light source formed in an outer end portion of the light source part and fixed to one of the first movable member and the second movable member to move.

2. The projector of claim 1, wherein the first movable member is not relatively rotated with respect to the first slot based on the vertical axis as a rotation axis, and
wherein the second movable member is not relatively rotated with respect to the second slot based on the vertical axis as a rotation axis.

3. The projector of claim 1, wherein the first movable member and the second movable member are configured to be mutually rotatable based on the vertical axis as a rotation axis.

4. The projector of claim 1, wherein each of the first slot and the second slot has a constant curvature radius.

5. The projector of claim 4, wherein a curvature center of the first slot is provided on a rotation axis of the second guide member, and
a curvature center of the second slot is provided on a rotation axis of the first guide member.

6. The projector of claim 4, wherein a curvature center of the first slot is coincident with a curvature center of the second slot.

7. The projector of claim 6, wherein the rotation axis of the first guide member and the rotation axis of the second guide member are vertical to each other.

8. The projector of claim 1, further comprising:
a variable structure configured to vary the first movable member and the second movable member to be apart from or close to each other with respect to a direction of the vertical axis.

9. The projector of claim 1, further comprising:
a first bearing structure disposed between the first movable member and the first slot; and
a second bearing structure disposed between the second movable member and the second slot.

10. The projector of claim 9, wherein the first bearing structure and the second bearing structure each comprise:
a bearing ball; and
a ball seating space formed longitudinally in the corresponding slot such that the bearing ball is sit therein.

11. The projector of claim 1, further comprising:
a first support rib that protrudes from the first movable member vertically to the vertical axis to cover a top surface of the first slot; and
a second support rib that protrudes from the second movable member vertically to the vertical axis to cover a bottom surface of the second slot.

12. The projector of claim 1, wherein an inner end portion of the light source part has a. curved surface having a constant curvature radius.

13. The projector of claim 12, wherein a curvature center of the inner end portion of the light source part is coincident with curvature centers of the first slot and the second slot.

14. The projector of claim 12, further comprising:
a protruding surface for supporting the inner end portion of the light source part.

15. The projector of claim 1, wherein the first driving part comprises:
a first motor; and
a first connection member configured to connect the first guide member and the first motor, and
wherein the second driving part comprises:
a second motor; and
a second connection member configured to connect the second guide member and the second motor, and
each of the first connection member and the second connection member is provided to be shifted to a ground from each rotation axis of the first guide member and the second guide member.

* * * * *